(12) United States Patent
Marcjan

(10) Patent No.: US 7,620,685 B2
(45) Date of Patent: Nov. 17, 2009

(54) SMART SHARES AND TRANSPORTS

(75) Inventor: Cezary Marcjan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 866 days.

(21) Appl. No.: 10/828,941

(22) Filed: Apr. 21, 2004

(65) Prior Publication Data
US 2006/0031489 A1 Feb. 9, 2006

(51) Int. Cl.
*G06F 15/16* (2006.01)
(52) U.S. Cl. .............. 709/204; 709/216; 709/218; 709/229; 709/231; 709/232
(58) Field of Classification Search .......... 709/203, 709/204, 205, 206, 207, 219, 225, 229, 248, 709/220, 240, 216, 218, 231, 232
See application file for complete search history.

(56) References Cited

U.S. PATENT DOCUMENTS

| | | | | |
|---|---|---|---|---|
| 4,802,220 | A * | 1/1989 | Marker, Jr. | ............. 380/33 |
| 5,619,647 | A * | 4/1997 | Jardine | ............. 709/240 |
| 5,719,942 | A | 2/1998 | Aldred et al. | |
| 5,761,602 | A * | 6/1998 | Wagner et al. | ............. 725/34 |
| 5,956,715 | A | 9/1999 | Glasser et al. | |
| 6,061,664 | A | 5/2000 | Glasser et al. | |
| 6,308,173 | B1 | 10/2001 | Glasser et al. | |
| 6,339,826 | B2 | 1/2002 | Hayes, Jr. et al. | |
| 6,498,935 | B1 * | 12/2002 | Cannon et al. | ............. 455/464 |
| 6,678,720 | B1 * | 1/2004 | Matsumoto et al. | ......... 709/204 |
| 6,877,038 | B2 * | 4/2005 | Hakenberg et al. | ......... 709/232 |
| 6,883,065 | B1 * | 4/2005 | Pittelkow et al. | ............. 711/114 |
| 7,061,929 | B1 * | 6/2006 | Eberle et al. | ............. 370/423 |
| 7,167,981 | B2 * | 1/2007 | Tanimoto | ............. 713/163 |
| 2003/0050980 | A1 * | 3/2003 | Dutta et al. | ............. 709/205 |
| 2003/0126213 | A1 * | 7/2003 | Betzler | ............. 709/206 |
| 2003/0225834 | A1 | 12/2003 | Lee et al. | |
| 2003/0236837 | A1 * | 12/2003 | Johnson et al. | ............. 709/205 |
| 2004/0107242 | A1 | 6/2004 | Vert et al. | |
| 2004/0143678 | A1 * | 7/2004 | Chari et al. | ............. 709/240 |
| 2008/0155109 | A1 * | 6/2008 | Khedouri et al. | ............. 709/229 |

OTHER PUBLICATIONS

Boris Peltsverger, et al., Inter-Personnel Communications and Network Security Procedures, Winter International Symposium on Information and Communication Technologies, Jan. 2004, 6 pages.

(Continued)

*Primary Examiner*—Michael Won
(74) *Attorney, Agent, or Firm*—Lee & Hayes, PLLC

(57) ABSTRACT

Disclosed is a unique system and method that facilitates more efficient sharing or transporting of content between at least any two computers. In particular, the type, security, and/or size of the content desired for "sharing" from one location (e.g., primary location) to another (e.g., remote or secondary location) can be examined. This information can be employed when determining which communication channel to utilize to effectuate the sharing process. This determination can also be based at least in part upon which communication channels are open and available between at least any two computers. Other factors that can influence the manner in which content can be transported or shared include the communication connection type or speed, the security associated with the connection, the identity user(s), as well as access or sharing rights.

20 Claims, 8 Drawing Sheets

OTHER PUBLICATIONS

Darren Bolding, Network Security, Filters, and Firewalls, Crossroads, 1995, pp. 8-10, vol. 2 Iss. 1, ACM.

P. Rolin, et al., Network Security Probe, CCS '94, 1994, pp. 229-240, ACM, Fairfax, VA.

Arne Helme, et al., Security Functions for a File Repository, ACM SIGOPS Operating Systems Review. 1997, pp. 3-8, vol. 31 Iss. 2, ACM.

Kei Hiraki. et at, Data Reservoir: Utilization of Multi-Gigabit Backbone Network for Data-Intensive Research, 2002, pp. 1-9, IEEE.

* cited by examiner

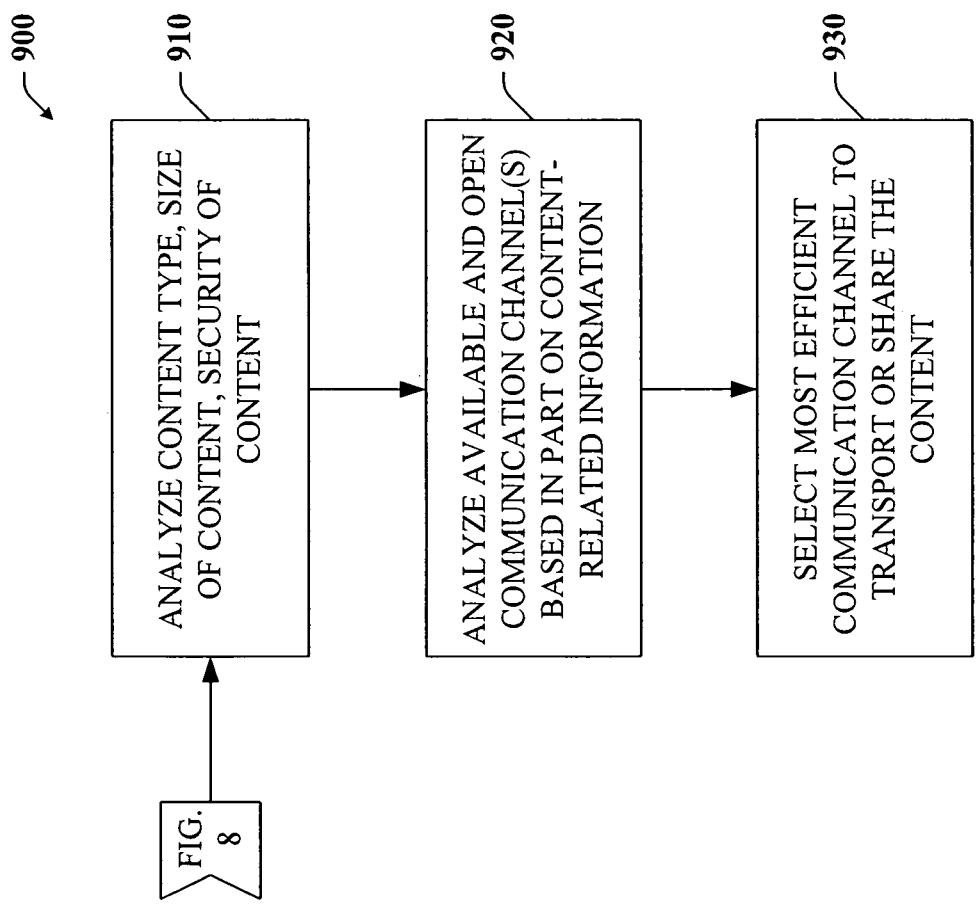

SMART SHARES AND TRANSPORTS

TECHNICAL FIELD

The present invention relates generally to sharing content and in particular, to automatically determining a most efficient and secure communication channel based in part on its availability and the shared content.

BACKGROUND OF THE INVENTION

Computers were developed to aid people with repetitive tasks that were deemed to be extremely time consuming. Most of the early computers were used for complex mathematical problem solving. The first computing machines were extremely large compared to computers utilized today. Despite their enormous size, the early machines had vastly less computing power than today's machines. Generally speaking, the sizes of computing devices were driven by the sizes of the existing electronic components of that era. This meant that only large research facilities or big businesses could employ computing machines. As new technology allowed for smaller electronic devices to be developed, computing devices also diminished in size. Although still lacking in power by today's standards, the size of the computing machine was reduced enough that it could be placed on a typical desk. Thus, the "desktop computer" was born. This allowed users to have computing technology available in locations other than a central computing building. People found that having the capability to utilize computing technology at their work desk, rather than submitting computing problems to a central location, made them much more productive at their jobs. Eventually, the idea of moving the desktop computer to the home environment to provide even more convenience for doing work became a reality. However, a challenge still existed for accessing information from one's work computer from their laptop from a remote location.

Technology came to the rescue with a first attempt at connecting these computers utilizing telephonic modern technology. This permitted individual users to connect via direct dial-up telephone connections. This was great for local telephone calls, but enormously expensive for long distance calls. However, with the advent of the Internet, all that has changed. It provides an inexpensive means to connect computers from all over the world. As a result, not only has remote communication and access been improved but communication between any number of people has been made possible through electronic messaging such as electronic mail, instant messaging, and online chat programs.

Despite the substantial advances in devices and methods of accessing information, sharing information such as between two different computers continues to be difficult. This may be due in part to the large number of security measures businesses and individuals take to protect their files as well as their personal information from being shared with or accessed by other users. Consequently, current network file sharing techniques can be severely restricted.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and methodology that facilitate sharing and/or transporting content between users or between computers. Sharing content or files may be one of the most common computing tasks for people today and yet it is one of the hardest tasks particularly when efficiency and/or security are of concern. Extending existing operating systems together with at least one aspect of the present invention can make most file sharing scenarios easier for the user.

More specifically, the invention provides for a novel content sharing system and method that can allow more efficient and more secure access to another's files or content. In particular, the type and/or size of the content desired for "sharing" from one location (e.g., primary location) to another (e.g., secondary location) can be examined. This information can be employed as a factor when determining which communication channel to effectuate the content sharing. This determination can also be based at least in part upon which communication channels are open and available between the sharing parties.

Other factors that can influence the manner in which content can be transported or shared include the communication connection type or speed, the security associated with the connection, the identity of the users involved (e.g., a user that is providing content and a user wishing to access the content), sharing rights, and/or access rights. For example, a user may be restricted from sharing certain types of content. Similarly, a user may be restricted from accessing content of a particular type or size.

Several channels may be available for content sharing between two computers, though it is feasible that no channels may be available. In this instance, imagine that the content size exceeds a threshold for sharing via email and no other channels are available. The system can have a number of email addresses at its disposal for disseminating content or messages to users. Thus, a password or key code can be sent to the authorized user for him to access the content.

Alternatively, other channels can be available given the type and size of content to be shared or transported. For instance, a first channel can relate to direct access whereby a first computer can directly connect to and access content from a second computer. A second channel can be a proxy server in which there is constant communication between the computers and the proxy but no information is saved locally. A third channel may involve a web server on the internet where a shared folder can be maintained and accessed by any number of computers; and a fourth channel can include at least one email pathway between the computers. Thus, the present invention can optimize file sharing between at least any two computers by determining which channels are available and by selecting the optimal channel to transport the information from one computer to another. As a result, users who wish to share content between computers can do so in a more efficient and secure manner which effectively reduces latency of transport time.

According to one aspect of the present invention, content to be shared can be placed in a virtual share space, for example. The virtual share space can be created by a primary user wherein the primary user can identify the content such as by file name. The primary user can also identify the respective users who are permitted to access such content with each respective file. Thus, the virtual share space can include a plurality of files with each file or share space associated with the (secondary) users who have been granted access to the particular file(s) or share space. This means that each file or group of files can be shared with different users and it is possible that not all identified users will have access to all of the content in any one particular share space.

In the alternative, a plurality of virtual share spaces can be created such as per secondary user or per content, for example. The authorized users can be identified accordingly. Access to the particular virtual share space can be granted after the user's identity is authenticated and a suitable communication channel is determined to be open and available to transport the content.

In particular, the user's identity can be validated to determine whether the user has the requisite rights to access, view, and/or transport the desired content from the primary user's computer (e.g., virtual share space) to his computer. Validation of a user's identity can include resolving multiple personas of a user. For example, the system can recognize that two different usernames logging in from two different locations may in fact correspond to the same person. This can be accomplished in part by examining various types of information extracted from or exchanged between the two computers.

Alternatively, a primary user can maintain on his computer or server a list of secondary users or computers to which access to shared files has already been granted. This list can therefore include the other personas of the primary user as well as other people who have been granted access rights to particular content. If a match is made, then access can be granted. Multiple lists can be created and maintained to delineate the secondary users according to their relationship with the primary user and/or their respective security levels, for example. Hence, there can be a list of work colleagues who can access another's work-related content through this sharing process. In addition, there may be a family or friends list of those who are only allowed to access the user's non-work related content.

According to another aspect of the invention, once a communication channel is selected, its level of security can be assessed to determine whether it is suitable for transporting content. For example, a connection between a home computer and a work computer may be less secure than the connection between two work computers (e.g., at the same company). A security threshold can be set by the primary user to facilitate determining when to permit content sharing with another computer (e.g., at least one computer). For instance, a user's home computer can be less secure than user's work computer. If the security associated with the "home" communication channel and connection do not satisfy this security threshold, then access can be denied (e.g., shared file may not open or be accessible or viewable) to the "home" user. Likewise, some communication channels can have content size limitations or thresholds. Hence, if the size of the content does not satisfy a size threshold for a particular channel, then that channel can be deemed unsuitable and thus unavailable to effect sharing the content.

Moreover, as long as one channel is open and available, then the computers can communicate and exchange information to determine whether other more efficient channels are available to them. In some cases, security may or may not be a concern depending on the type of content being shared. As briefly mentioned above, content can be shared even when no communication channels are available. In these circumstances, the primary user can assign a unique key to the one or more files or virtual share spaces, as appropriate, and can provide the key via email, for example. The secondary user can then access the virtual share space by inputting the unique key.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 9 is a flow chart illustrating an exemplary methodology that facilitates filing sharing in part by selecting a more efficient communication channel based in part on the content and the available channels open between the computers in accordance with an aspect of the present invention.

DETAILED DESCRIPTION OF THE INVENTION

Figure 1:
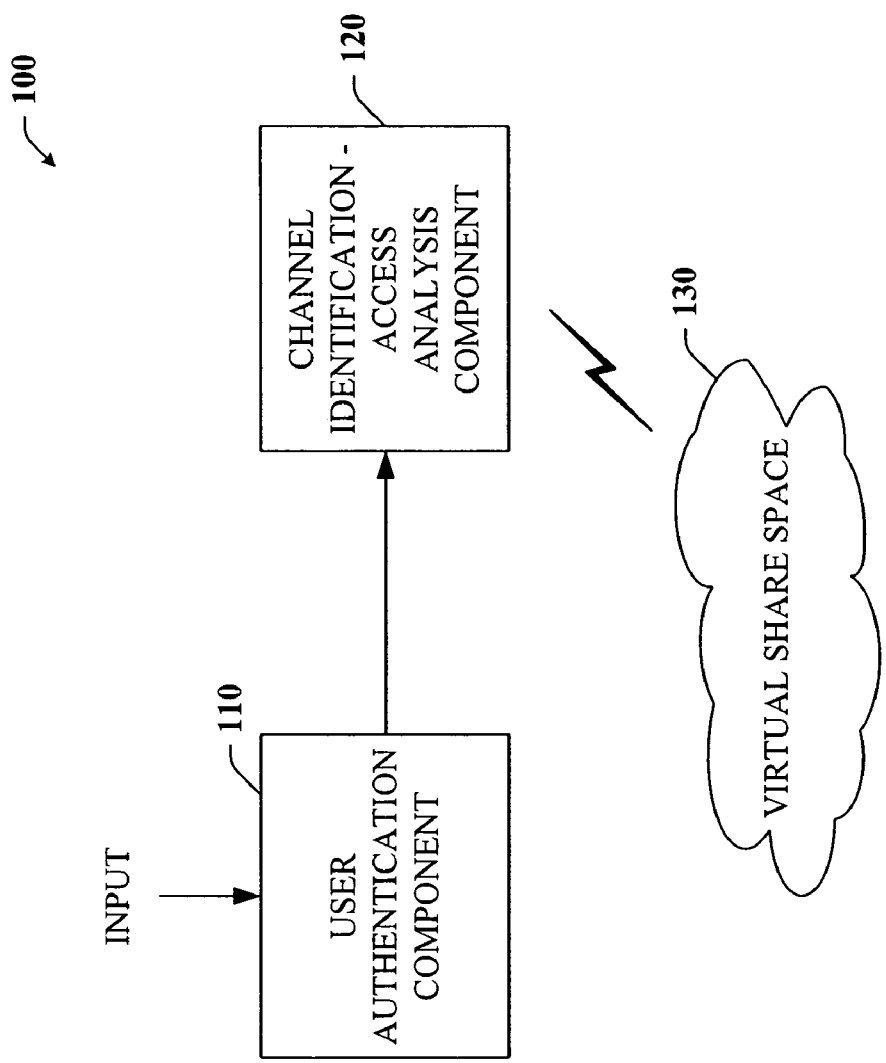
FIG. 1 is a high-level block diagram of a file sharing system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with generating training data for machine learned spam filtering. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

As used in the present invention, the phrase "primary user, computer or location" can refer to a location, computer or user who possesses the information sought to be accessed by others such as "secondary users". Thus it is possible for any computer or user to be described as primary and/or secondary depending on the location of content made available for sharing with others.

Conventional methods for sharing computer files (e.g., documents, photographs, music, video, etc.) are currently severely restricted due to computer network accessibility, application compatibility, types of files, their sizes, available communication channels, protocols, and the like. For example, a large file may not be suitable for transfer in email due to the email service size restrictions. A network file share could be used but it can be accessed only from specific network locations.

In addition, people often use more than one computer on different protected networks. Oftentimes, people along with their computers can be at different physical locations separated by firewalls according to the organization of local networks. Thus, if there are two computers on the same network but at different physical locations separated by at least one firewall, then the two computers can be unable to communicate with each other. This is mostly because the firewall can block substantially all communications between a first computer and a second computer located on the same network. For example, a user's laptop at home can have great difficulty in successfully communicating with the user's desktop computer at his office. In addition, the user's laptop may even recognize that the user logging on at home is the same user who has access on the office computer. However, due to various barriers along the network, the home or remote laptop and the office desktop may still not be able to communicate with each other. Hence, it can be very challenging to share files even between a person's own computers which is a task commonly desired today.

Also multiple personas, aliases, and nicknames are typically used in communication and for authentication purposes on various computer systems which makes secure sharing even harder or close to impossible resulting in sharing content using some type of media storage such as CDs, DVDs, floppy disks, and/or flash media drives as the only feasible option.

Furthermore, people have to make a number of important decisions when sharing files that can make the sharing process rather cumbersome as well as ineffective in some cases. The types of important decisions include which applications to use, what services to use, which communication channels and protocols to use depending on the types of data, sizes, required security level, and/or network accessibility. For example, a sufficiently large file cannot be shared using an email attachment method but it could be shared on a network file share. This network location may or may not be accessible by the other party so additional decisions must be made like selection of internet data storage service for the task or allowing direct access to the person's computer by placing it outside a local firewall and starting a sharing service such as FTP or WWW—both of which enable sharing but decrease security. Hence, files may be small enough for email but could be the wrong type (e.g., they can be filtered out or removed by the email service).

In accordance with an aspect of the present invention, the systems and methods as described herein below facilitate allowing access and secure file sharing between any two computers. Moreover, various aspects of the present invention can automatically determine the most appropriate communication channel to use to allow secure communication between at least any two computers regardless of their physical and/or network location.

Referring now to FIG. 1, there is a general block diagram of a content sharing system 100 in accordance with an aspect of the present invention. In particular, the file sharing system 100 can determine a most appropriate communication channel to use to allow secure and efficient communication of information between at least two computers—a primary computer (possessing data or information to be shared with others) and at least one secondary computer (desiring to access the data on the primary computer).

The system 100 includes a user authentication component 110 that can verify or confirm a user's identity. The authentication component 110 can receive input comprising various kinds of useful information from at least one (secondary) computer that may be requesting to access some data from another (primary) computer. Examples of types of information can include, but is not limited to, login name, username, user password, user's domain name, user nickname, user's server information, user's email service, connection type and capacity, and/or any other information that can verify the (primary and/or secondary) user's identity.

Once the user identity is authenticated, a channel identification and access analysis component 120 can scan at least the secondary computer requesting access to determine which communication channels are available based in part on the type of content included in a virtual share space 130. The channels available on the secondary computer can be examined for compatibility with the primary computer and/or more importantly, with the content to be shared.

Shared content can be obtained from the virtual share space 130 which can be created by the primary user. The share space 130 may comprise one or more files of similar or different types. Moreover, the virtual share space 130 can be located on the primary computer and accessed using various communication channels. If no common channel is available between the two computers, then the primary user or computer can assign a unique key or access code to the virtual share space. By entering the unique key or access code, the secondary user can gain access to this particular share space without maintaining any type of electronic connection with the primary user or computer.

In addition, the contents of the virtual share space 130 can be individually or group-coded for access by particular users. For example, a first secondary user may only gain access to a certain group of content or files in the virtual share space 130. Alternatively or in addition, only that content to which the secondary user has access may be visible to the user.

Figure 2:
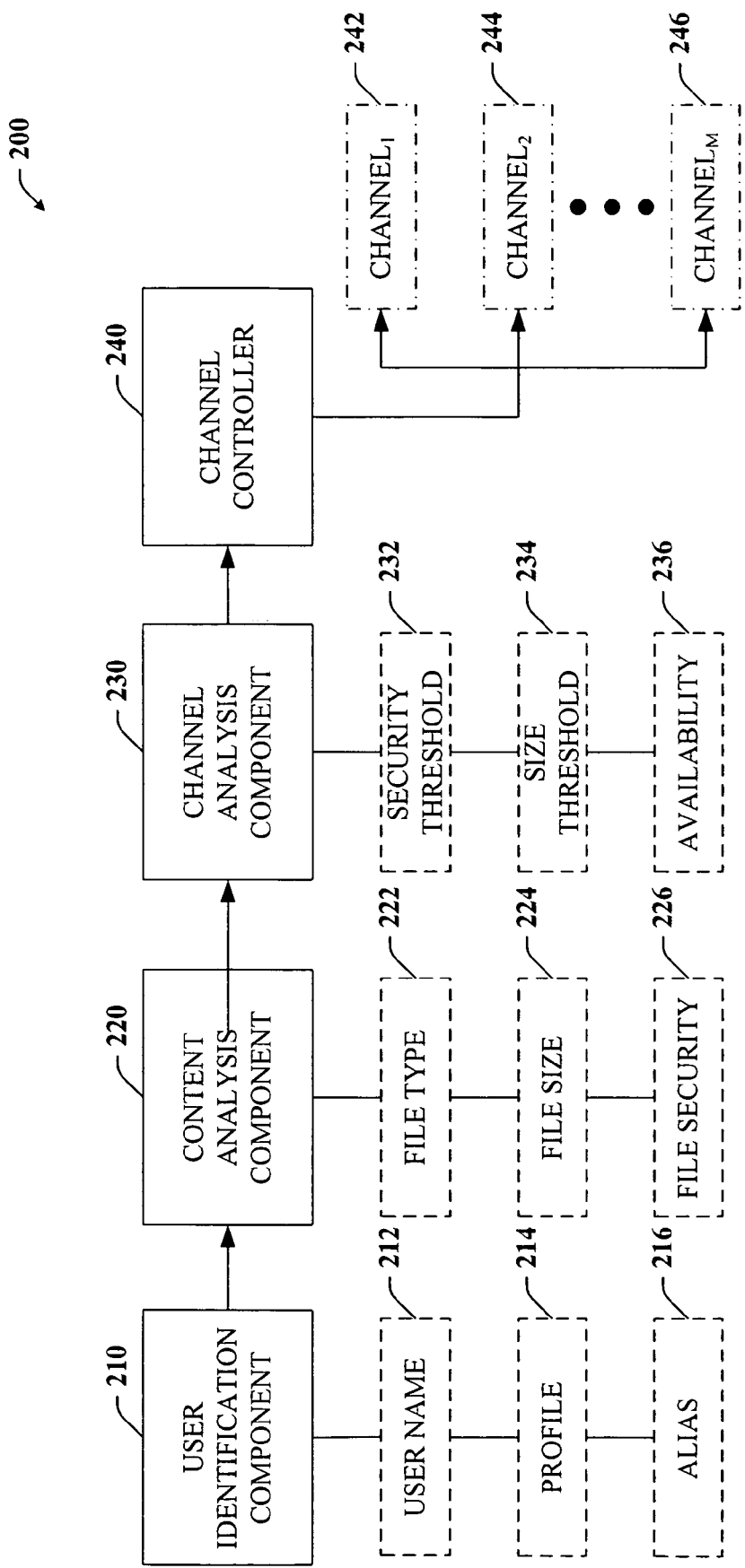
FIG. 2 is a block diagram of a file sharing system in accordance with another aspect of the present invention.

Referring now to FIG. 2, there is illustrated a content sharing system 200 that can facilitate determining which communication channel to use to share information between at least two computers. In particular, the system 200 comprises a user identification component 210 that can examine usernames 212, user profiles 214, and/or user aliases 216 to accurately identify and/or authenticate the user's identity on one or both computers seeking to communicate with each other. Such users may already be known to each other; thus, their information may have been stored and/or configured at an earlier time. In some cases, the users can be programmed or associated with certain content before they request to access such content.

After the identity of the user(s) has been confirmed, a content analysis component 220 can examine any number of characteristics relating to the content sought to be shared, such as for example, the type 222 of content, size 224 of content, and/or security level 226 of content. Because some channels are not compatible with some types of content, this information can influence which channel is ultimately selected. For instance, imagine that the content analysis component determines that the content contains images (e.g., JPEGs, GIFs, and/or BMPs) that are relatively large in size (e.g., greater than 4 MB in total) and are at a relatively high security level.

The content-related information can be communicated to a channel analysis component 230. The channel analysis component 230 can assess the requisite security level threshold 232, content size threshold 234, and/or availability 236 of the channels to determine which communication channel to use. For example, a security threshold can be set or assigned to content based on the type of content or even the source of the content (e.g., primary user or computer). If it is not satisfied, a communication channel can be denied access. Imagine that a primary user desires to share confidential images (e.g., has a relatively high security level) with one or more secondary users. The secondary user must have a communication channel that is also highly secure to correspond to the security level associated with the images. In addition, the channel(s) must be available or open and able to receive the type (e.g., images) and size (e.g., greater than 4 MB) of content from the primary user.

The channel analysis component 230 can make its determination with respect to the most appropriate channel to employ to share the desired content in the most efficient manner while maintaining the requisite security. This information can be provided to a channel controller 240. The channel controller 240 can select and/or activate the proper channel (e.g., CHANNEL$_1$ 250, CHANNEL$_2$ 260 and/or up to CHANNEL$_M$ 270, where M is an integer greater than or equal to one) to proceed with sharing the content between the computers.

One or more channels may be available and demonstrate similar efficiency and security qualities. In this case, the channel controller 240 can select the most preferred channel according to user or sharing system preferences. Exemplary channels can include, but are not limited to, email (system-generated attachment(s) or manual attachments), server, proxy server, direct access to the primary computer, and/or internet sharing service.

In addition to being available, the various channels should be compatible on the respective computers. Take the email channel, for example. The type of email service or system utilized on at least both computers can determine whether the computers are accessible to each other via the email communication channel. In the present invention, the email communication channel can include and/or make use of a special module which may be added by the system 200 to the email client system. Installation of the special module can be determined according to user preferences.

On the sender's end, the module can divide a large file into smaller chunks that can be managed by the email system. The first chunk can then be sent to the recipient. On the recipient's end, the module intercepts the chunk and removes it from the email store, thereby freeing the space (chunks are identified with special keys in the subject and/or the email headers and may be encrypted depending on the security requirements). After removing the chunk from the email store, the module or some other component of the email system can save it in the recipient's local file system which can be followed by sending back an acknowledgement message to the sender. After the acknowledgement has been received by the sender, the next chunk can be processed in a similar manner as above. After processing the last chunk, the recipient's email system can assemble all of the chunks (and optionally decrypt them) to create a copy of the shared file.

Without this module, manual attachments can be generated by the sender; however, some email services may prohibit certain types of attachments or may invoke strict size limitations. In some instances, sending manual attachments may be the only viable option. If in these cases the content does not satisfy a size threshold instituted by the sender or receiver's email service, the system 200 can employ any one of the email addresses at its disposal to provide password access to the recipient(s).

A similar method may be used for other types of channels especially external file stores (e.g., web service, ftp service) with limited capacities. For example, a DSL provider often gives several mega bytes of storage available for subscribers on the provider's external servers that can be utilized for this purpose.

Figure 3:
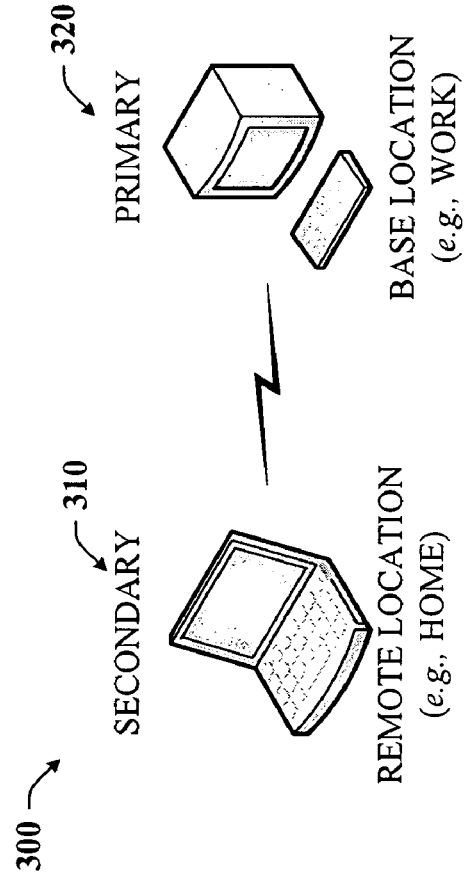
FIG. 3 is a schematic diagram of an exemplary computer at a remote location interacting with an exemplary computer at a primary location to gain access to content from the computer at the primary location in accordance with yet another aspect of the present invention.
Figure 4:
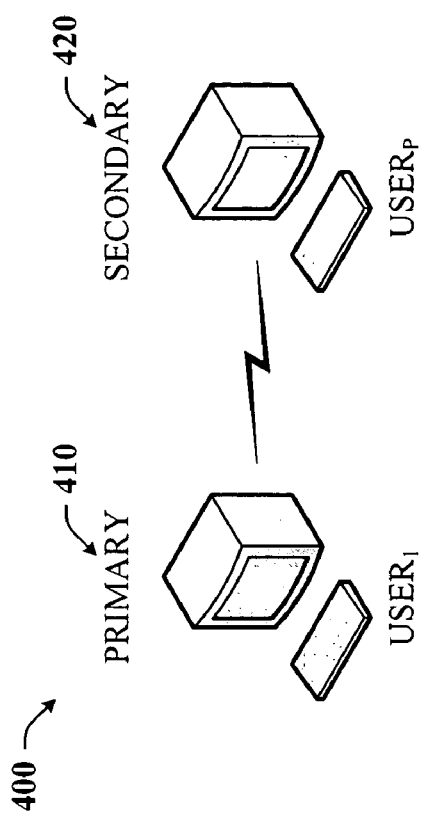
FIG. 4 is a schematic diagram of at least two computers communicating with on another to share information with each other in accordance with still another aspect of the present invention.

FIGS. 3 and 4 depict different scenarios in which employing the content sharing systems of FIGS. 1 and/or 2 may be desirable. In FIG. 3, there is illustrated a schematic diagram 300 of a first 310 (secondary) computer desiring to access a second 320 (primary) computer to obtain some amount of information for viewing or downloading to the secondary computer 310. In this particular scenario, the same user may be associated with both computers. For example, the user may be working from a remote location (e.g., on laptop at home) and may want or need to access some content from his work computer (e.g., base location). Since the content is originating from the base location 320, it can be referred to as the primary location or computer.

FIG. 4 demonstrates a slightly different scenario 400 from that in FIG. 3. In particular, there is illustrated a schematic diagram of two different users—USER$_1$ 410 and up to USER$_P$ 420 (on two different computers), where P is an integer greater than or equal to one. For instance, USER$_P$ 420 can be considered a secondary user or computer because it may be trying to access content originating from USER$_1$ 410. In this scenario 400, the system may require authentication of the identities of both users; however, it should be appreciated that USER$_1$ 410 need not be "logged on" to his computer for USER$_P$ 420 to access a virtual space share, for example, created or "owned" by USER$_1$ 410.

Figure 5:
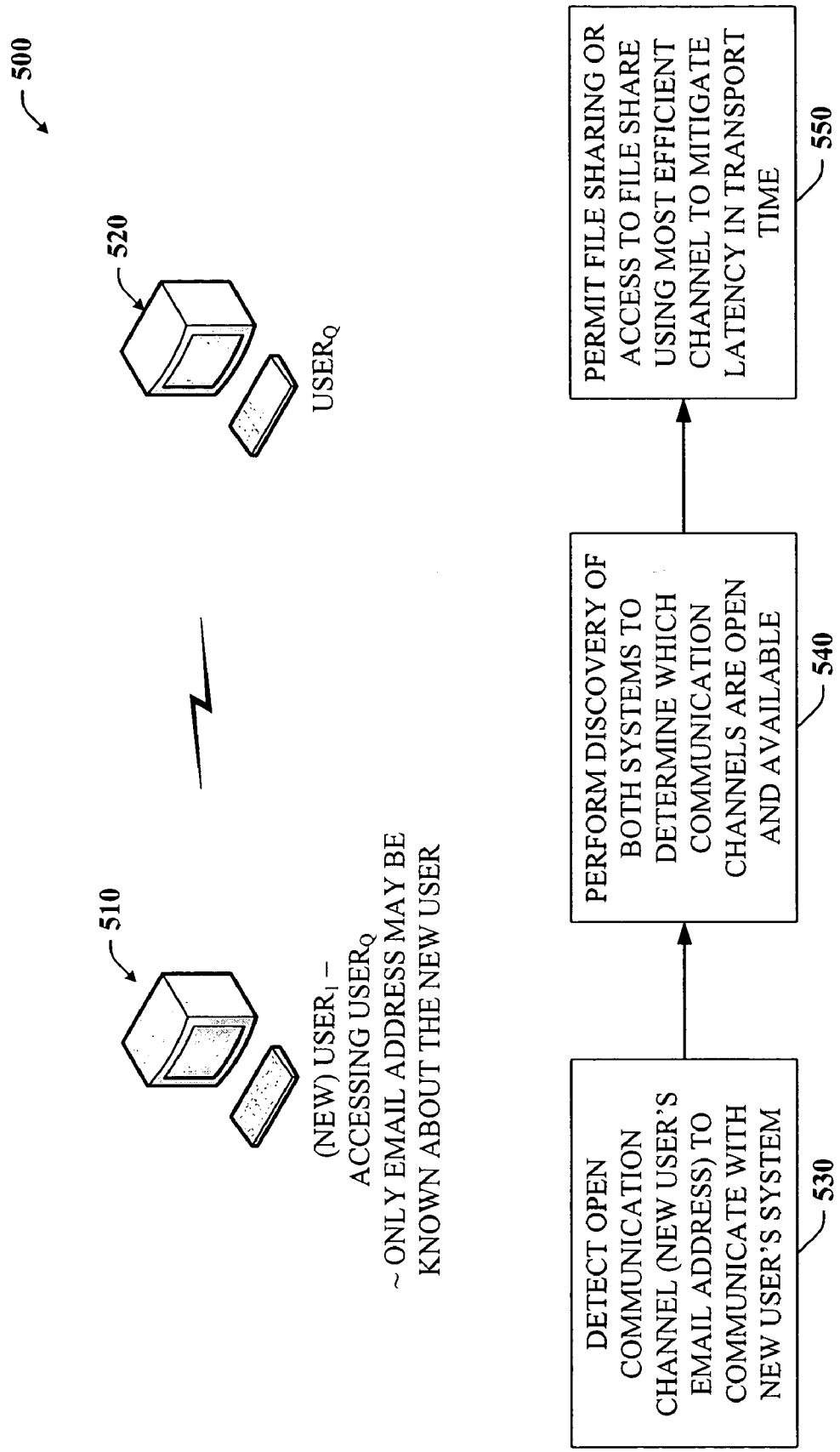
FIG. 5 is a schematic block diagram of at least two exemplary users who desire to share information however at least one of the two users is new in accordance with an aspect of the present invention.

Turning now to FIG. 5, there is illustrated a schematic diagram 500 of a file sharing scenario 500 in which a "new" USER$_1$ 510 is involved. In particular, imagine that new USER$_1$ 510 can initiate communication with USER$_Q$ 520 via email. Because no other information is known about new USER$_1$ 510 aside from its email address, the email address as well as information extracted therefrom can be utilized to allow communication between the two systems (530). More specifically, discovery can be performed on both systems (510 and 520 computers) to determine which communication channels are open and available and compatible with respect to both users as well as the content sought to be shared (540). Following therefrom, file sharing or access to a file share can be permitted using a most efficient communication channel that mitigates latency in the transport time of the content (550).

Figure 6:
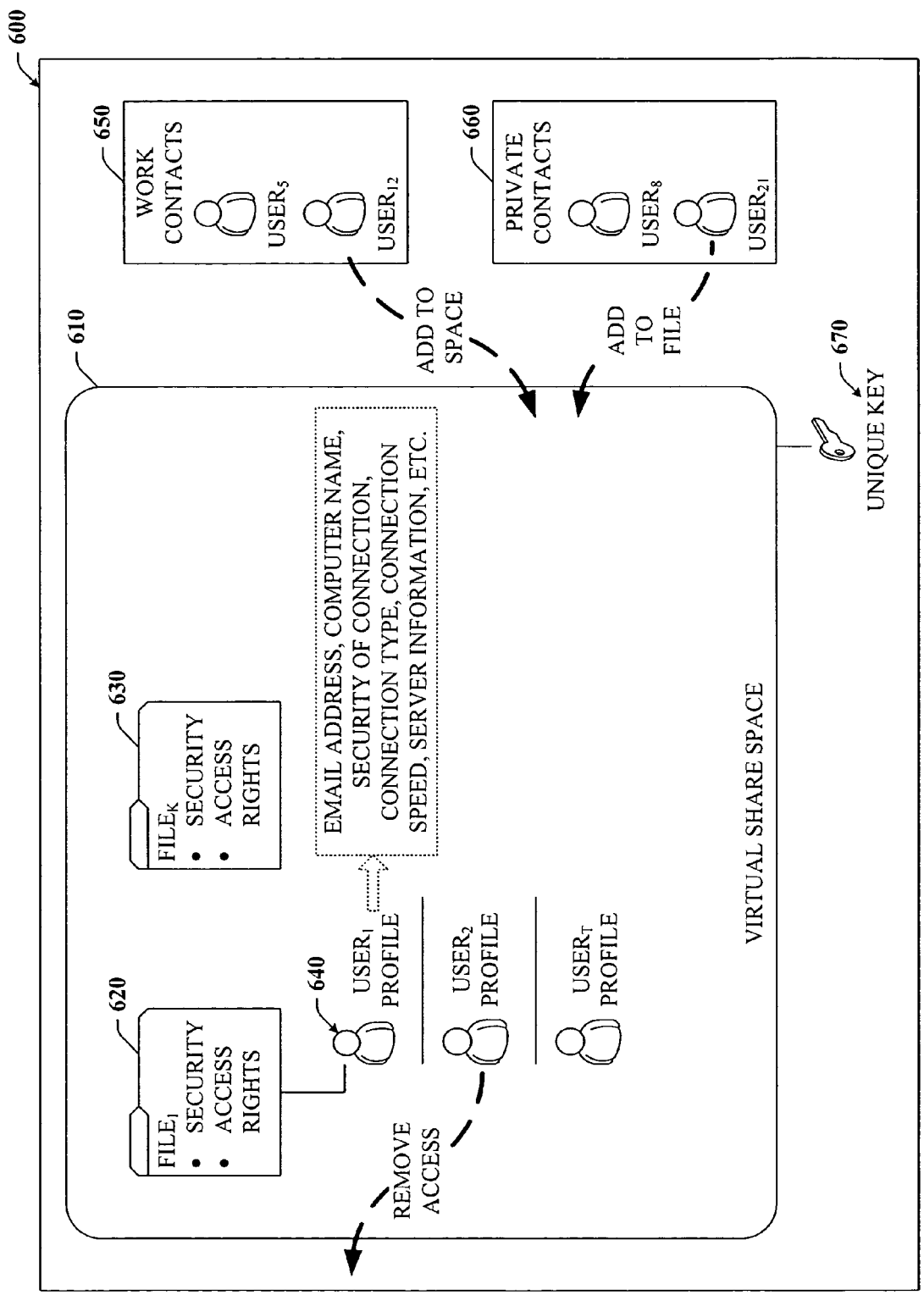
FIG. 6 is a schematic diagram of an exemplary user interface demonstrating a virtual share space having users added or removed from the virtual share space based on their grant or denial of access rights in accordance with an aspect of the present invention.

Referring to FIG. 6, there is illustrated a schematic diagram of an exemplary user interface 600 that can be presented to a (primary) user originating a virtual share or other shared content space 610. In particular, the virtual share space 610 can include one or more files such as FILE$_1$ 620 up to FILE$_K$ 630 (where K is an integer greater than or equal to one). Each particular file can have one or more (secondary) users associated therewith. Each of these users presumably has access rights to the particular file or cluster of files which can mean that the primary user has granted access preemptively or in advance, knowing that one of these particular users should have access thereto. For example, USER$_1$ 640 may work in the same group as the primary user.

In order to provide access rights to USER$_1$ 640, the primary user can set up a profile for USER$_1$ 640 including, but not limited to, his email address, computer name, security levels of connection, connection speed or type, and/or any pertinent server information that can facilitate identifying the USER$_1$ 640 as well as determining the available communication channels.

Furthermore, the primary user can generate and store contact lists which indicate work or business contacts 650 separately from private contacts 660. The primary user can then simply grant access rights to the virtual space 610 in general or to specific files 620 by dragging the respective user to the desired space 610, file, or cluster of files. It should be appreciated that multiple virtual share spaces can be created and be distinguishable in part by a unique key 670 assigned to each one. When no communication channels are available between any two computers, the unique key can be given to a particular secondary user. Thus, one key can be assigned per virtual share space 610. Alternatively, secondary users may be given a different key for the same share space which allows them to see only the content for which they are granted access rights.

Users who have lost or no longer require access to any particular share space or file can be removed accordingly. For example, their names (e.g., username, alias, nickname, real name) can be dragged out of or deleted from the virtual share space 610.

Various methodologies in accordance with the subject invention will now be described via a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 7:
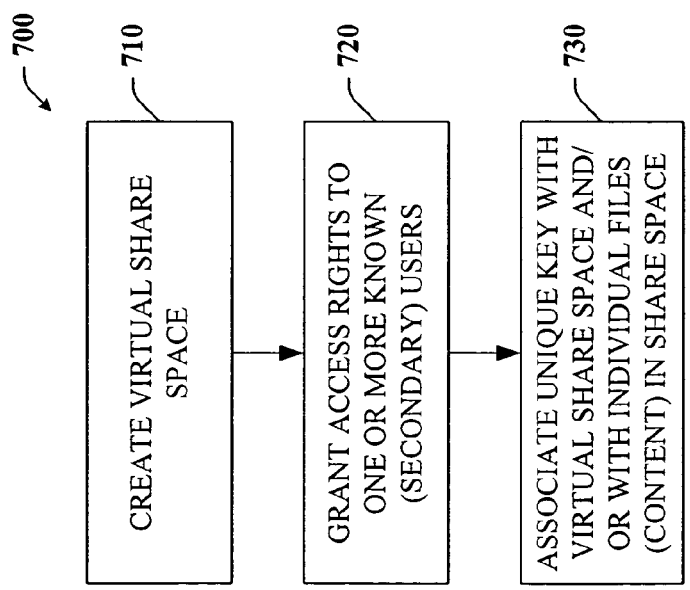
FIG. 7 is a flow chart illustrating an exemplary methodology that facilitates filing sharing via an efficient and reliable communication channel in part by creating a virtual share space in accordance with an aspect of the present invention.

Referring now to FIG. 7, there is a flow diagram of an exemplary method 700 that facilitates the sharing of content between different computers in accordance with an aspect of the present invention. The method 700 can involve creating one or more virtual share spaces at 710. For example, a primary user can create a virtual share space by moving or copying content thereto that he desires to share with other users and/or computers. Moreover, files can be maintained in the virtual share space. The user can grant access rights to particular users by programming or associating their identity in some form to one or more particular files or to the share space in general (at 720). More specifically, their identity can be established by inputting their email address or user name or computer name. When any one of these identification means is recognized by the share space or other authentication system, the user can be permitted to access the shared file.

Alternatively or in addition, a unique key (e.g., share key) can be assigned to the share space and made known to the pertinent secondary users at 730. The unique key can be similar to a password and can be particularly useful when no other communication channels are available for sharing or transporting the content. Moreover, access rights can follow a person as well as the respective file share space regardless of what computer is being used to access such file share space. As a result, information and users alike can be even more mobile.

Figure 8:
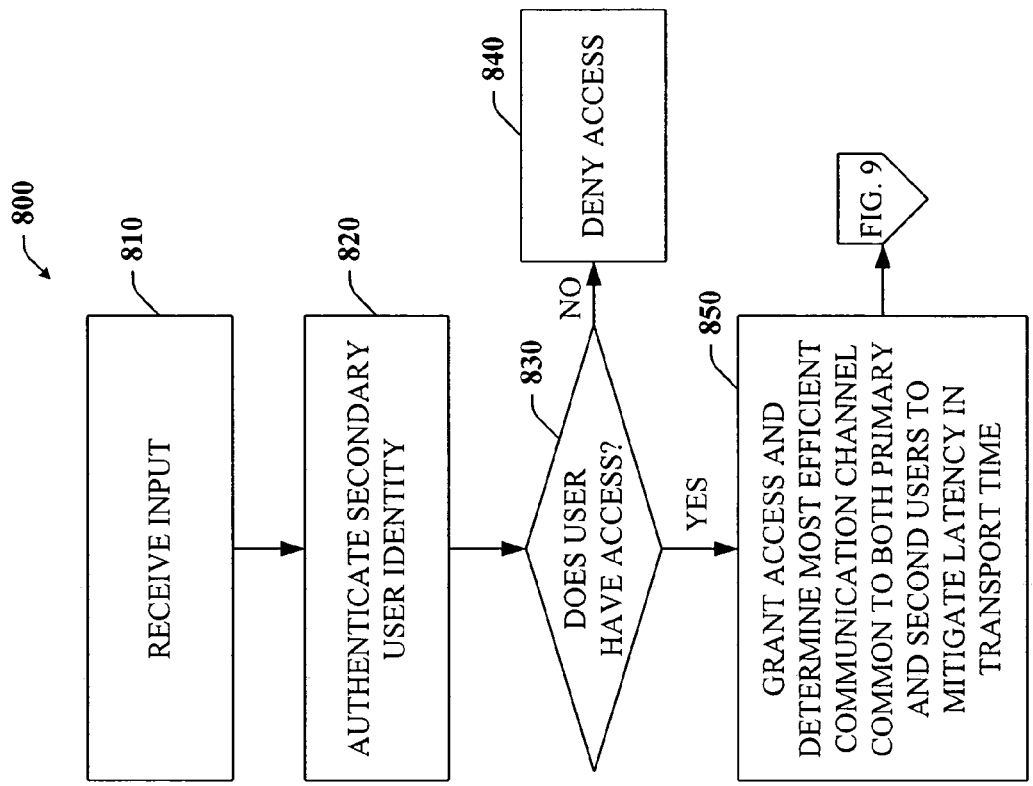
FIG. 8 is a flow chart illustrating an exemplary methodology that facilitates filing sharing in part by selecting a more efficient communication channel based in part on the content, the users who desire access, and the available channels open between the computers in accordance with an aspect of the present invention.

Referring to FIG. 8, there is illustrated a flow diagram of an exemplary method 800 that facilitates content file sharing or transporting in part by automatically selecting a communication channel in accordance with an aspect of the present invention. In particular, the method 800 can begin with receiving input from a person (e.g., secondary user) requesting access to some content located on another person's (e.g., primary user) computer or network at 810. At 820, the secondary user's identity can be authenticated to identify the user. At 830, it can be determined whether the user has access. If the user does not, then access to the content can be denied at 840. However, if the user does have access, then access can be granted at 850 and the most efficient communication channel to employ between the two users can be determined to mitigate latency time in content transport or sharing. Determining which communication channel to use for file sharing is discussed in greater detail in FIG. 9.

FIG. 9 depicts a flow diagram of an exemplary method 900 that facilitates selecting a most efficient communication channel while maintaining a desired level of security that is available to both a primary and a secondary user. For instance, at 910, the type and/or size of the desired content to be shared or transported can be analyzed. This is because the type and/or size of the content can influence which channel is selected. Some channels are not equipped to handle relatively large amounts of content at once. In addition, some channels utilize services (e.g., email or internet) that do not permit certain types of files to be transported as attachments. Furthermore, some content can be relatively secure and thus require a relatively secure channel for sharing or transporting to another user (e.g., outside a protective firewall). Hence, analyzing the content to be shared for its type, size, and/or security level can be useful in determining what type of channel to employ for sharing such content at 920. At 930, the most efficient and suitably secure channel can be selected. It should be appreciated that the selected channel has been determined to be open and available to both computers regardless of their location (e.g., on same or different network or server).

Figure 10:
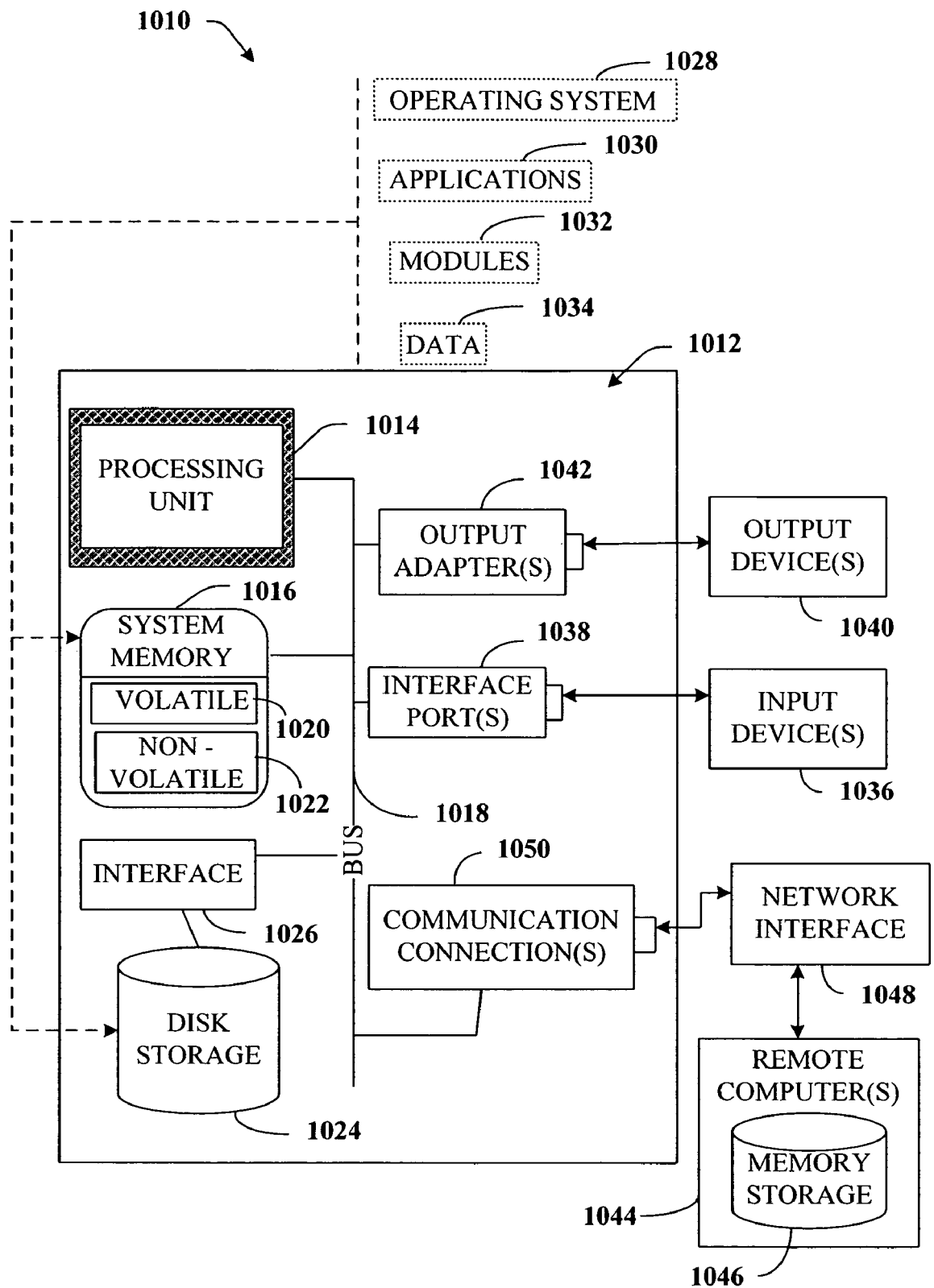
FIG. 10 illustrates an exemplary environment for implementing various aspects of the invention.

In order to provide additional context for various aspects of the present invention, FIG. 10 and the following discussion are intended to provide a brief, general description of a suitable operating environment 1010 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1010 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 10, an exemplary environment 1010 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/nonremovable, volatile/nonvolatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the present invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates file sharing between at least any two computers, comprising:
    an authentication component that verifies a user's identity based in part on a user-based input to determine whether a user has access rights to the file;
    a content analysis component that analyzes at least one file for which sharing is desired, the content analysis is based on at least one of a file type, a file content, a file size, or a file security level resulting in content-related information;
    a channel analysis component that identifies and determines whether any communication channels are available to share the file between the at least two computers based in part on one or more characteristics of the file communicated to the channel analysis component from the content analysis component;
    a channel controller component that selects at least one communication channel that is determined to be available to transport the file based in part upon analysis of the one or more characteristics of the file;
    one or more communication channels comprising a module installed on a sender's communication system and a module installed on a recipient's communication system, the module installed on the sender's communication system divides a large file into two or more smaller chunks, whereby each chunk is sent separately to the receiver and the receiver acknowledges receipt of each chunk before a subsequent chunk is sent; and
    the two or more chunks are encrypted in part by the module on the sender's communication system and decrypted in part by the module on the recipient's communication system and the two or more chunks are identified with one or more special keys in a subject line or an email header.

2. The system of claim 1, further comprising a virtual share space that is located on a primary computer and accessed using at least one communication channel and stores at least one file to be shared with one or more secondary computers.

3. The system of claim 2, the at least one file accessed using a unique key.

4. The system of claim 1, the communication channels comprising email, internet, server, proxy server, and direct access.

5. A computer readable storage medium having stored thereon the system of claim 1.

6. A system that facilitates file sharing comprising:
    a content analysis component that analyzes at least one file for which sharing is desired, the analysis is based on at least one of a file type, a file content, a file size, or a file security level, wherein the at least one file is located in one or more virtual share spaces;
    a channel analysis component that assesses at least one of a security level threshold, a file size threshold, availability or compatibility of a plurality of channels and determines based upon the channel analysis of the content analysis component the most appropriate channel to employ to share the at least one file;
    a channel controller component that selects at least one communication channel that is determined to be available to transport the at least one file based at least in part upon the channel and analysis and activates the selected channel;
    a authentication component that authenticates input to facilitate determining that a user has requisite access rights to gain access to the at least one file in a virtual space at least in part by matching a user-based input to one or more listing comprising users who are pre-approved for access as indicated by at least one of their username, a password, an email address, a network name, or a computer name, wherein the user is removed and no longer granted access when the user no longer needs access or has lost access, wherein the user is removed by dragging or deleting their name from the virtual space;
    one or more communication channels comprising a module installed on a sender's communication system and a module installed on a recipient's communication system, the module installed on the sender's communication system divides a large file into two or more smaller chunks, whereby each chunk is sent separately to the receiver and the receiver acknowledges receipt of each chunk before a subsequent chunk is sent; and
    the two or more chunks are encrypted in part by the module on the sender's communication system and decrypted in part by the module on the recipient's communication system and the two or more chunks are identified with one or more special keys in a subject line or an email header.

7. The system of claim 6, wherein the authentication component identifies the user by at least one of multiple personas, usernames, nicknames, or aliases.

8. The system of claim 6, one or more communication channels are deemed unavailable if they fail to satisfy the full size threshold.

9. The system of claim 6 located on a first computer that originates the file to be shared and on at least a second computer that desires access to such content.

10. The system of claim 9, the first computer is located at a first location and the second computer is located at a second location and both computers correspond to one user.

11. The system of claim 9, the first computer corresponds to a first user and the second computer corresponds to a second user, the first user being different from the second user.

12. The system of claim 6, access to at least a first portion of the at least one file is granted to a first computer, such that only the first computer is permitted to access the portion.

13. The system of claim 6, the channel analysis component communicates with an unknown computer to determine available communication channels and access rights of the computer at least in part by extracting information from the unknown computer using an open communication channel to detect user information.

14. The system of claim 13, the open communication channel is an email channel.

15. A content-sharing and transport method comprising:
creating one or more virtual share spaces on a primary computer to maintain content for sharing with other secondary computers;
receiving user-based input from a receiver in request to access content designated for sharing on the virtual share space;
authenticating the user-based input to confirm at least one of user identity or user access rights to the content;
selecting at least one communication channel to facilitate sharing with or transporting the content from the virtual share space to a secondary computer based at least in part on availability, analysis of the content, security threshold of the content and content size, wherein the selecting is performed by a channel analysis component;
installing a module on a sender's communication system and a recipient's communication system;
dividing a large file into two or more smaller chunks utilizing the module installed on the sender's communication system, wherein the two or more chunks are identified with one or more special keys in a subject line or an email header;
sending each chunk separately to the receiver;
intercepting each chunk using the module on the recipient's communication system, wherein the module is further configured to:
remove each chunk from the communication channel; and
save each chunk in a local file on the secondary computer;
acknowledging receipt of each chunk before sending a subsequent chunk;
assembling the two or more chunks to create a copy of the content;
encrypting the two or more chunks before sending each chunk; and
decrypting each chunk before or during the assembling of the two or more chunks, wherein the two or more chunks.

16. The method of claim 15, further comprising
approving access rights to one or more users for access to at least one virtual share space and storing the access rights alongside the respective content.

17. The method of claim 15, further comprising assigning a unique key to the one or more virtual share spaces to facilitate permitting anytime access to at least a portion of the content in the virtual share space.

18. The method of claim 15, the communication channel is any one of email, server, internet, direct access to the content, and/or proxy server.

19. The method of claim 18, availability of the email channel depends in part on email service associated therewith.

20. A system that facilitates sharing content between at least any two computers comprising:
an authentication component that verifies a user's identity based in part on user-based input to determine whether the user has access rights to the content;
an analysis component that identifies and determines whether any communication channels are available to share the content between the at least two computers based at least in part on one or more characteristics of the content;
a content analysis component that analyzes at least one file for which sharing is desired, the analysis is based on at least one of a file type, a file content, a file size, or a file security level resulting in content-related information;
a channel controller component that selects at least one communication channel that is determined to be available to transport the content based at least in part upon analysis of the content and security of the content;
one or more communication channels comprising a module installed on a sender and a recipient's communication system that divides a large file into two or more smaller chunks, whereby each chunk is sent separately to the receiver and the receiver acknowledges receipt of each chunk before a subsequent chunk is sent, wherein the two or more chunks are encrypted in part by the module on the sender's communication system and decrypted in part by module on the recipient's communication system and the two or more chunks are identified with special keys in subject line or email headers; and
a virtual share space that stores content to be shared with one or more other computers, wherein the virtual share space is accessed by at least one of at least one communication channel or a unique key.

* * * * *